L. O. FRENCH

Sept. 15, 1931. FUEL INJECTION SYSTEM Re. 18,194

Original Filed March 26, 1926

INVENTOR.

Louis O. French

Reissued Sept. 15, 1931 Re. 18,194

UNITED STATES PATENT OFFICE

LOUIS O. FRENCH, OF MILWAUKEE, WISCONSIN

FUEL INJECTION SYSTEM

Original No. 1,664,615, dated April 3, 1928, Serial No. 97,637, filed March 26, 1926. Application for reissue filed March 21, 1930. Serial No. 437,925.

This invention relates to fuel injection systems and more particularly to those systems wherein an electromagnetically-operated fuel-metering device is used to control the amount of fuel delivered to the engine and directly or indirectly control the time at which such fuel is delivered.

In certain classes of work it is desirable to furnish the same amount of fuel per cycle to the engine cylinder through a wide range of engine speeds, regardless of the change in speed, and thereafter diminish the fuel charge and finally cut off the fuel supply when the speed of the engine reaches a predetermined maximum. Owing to the fact that the speed at which fuel is to be supplied in constant amount for each charge may vary several hundred revolutions, it is difficult to provide a governor-operated switch mechanism to take care of this constant quantity condition through wide ranges in speed, and the object of this invention is to provide control mechanism associated with the control circuit of an electromagnetically-controlled fuel-metering device whereby the periodic energization of the control magnet for said device will be substantially constant for a wide range of engine speeds and will be modified at higher speeds and to such an extent as to prevent the engine exceeding a predetermined maximum speed.

The invention further consists in the several features hereinafter set forth and more particularly defined by claims at the conclusion hereof.

In the drawings, Fig. 1 is a view of a fuel injection system, parts being shown in detail and other parts shown diagrammatically;

Figure 1:
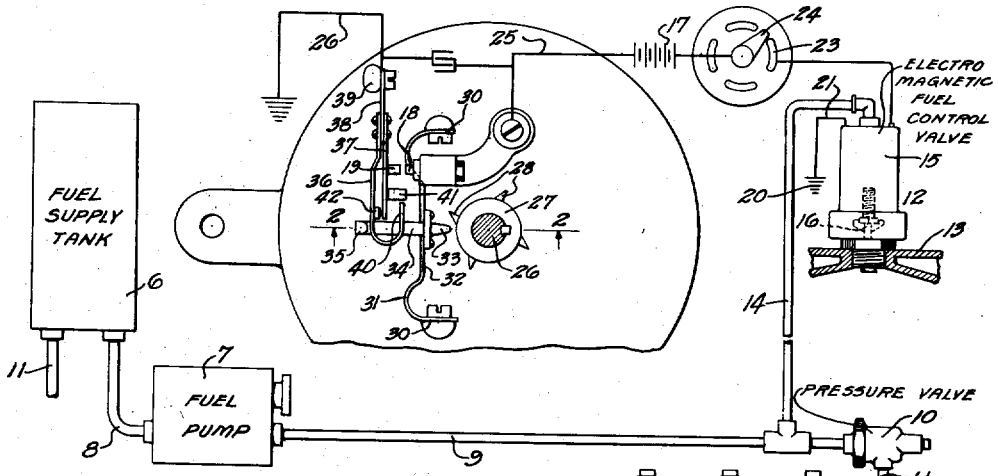

Referring to Fig. 1, the numeral 6 designates a fuel supply tank, 7 a pump, generally engine driven, connected at its suction side by a pipe 8 with said tank and at its delivery side with a discharge pipe or line 9 which has a pressure valve 10 mounted therein to maintain the fuel pressure in the line 9 at a predetermined amount, but which permits excess fuel to return to the tank through a pipe 11.

An electromagnetically-operated metering device instanced here as a control valve 12 is associated with each cylinder 13 of the engine and controls the supply of fuel thereto from a branch pipe 14. This control valve may be of the type shown in my U. S. Patent No. 1,664,612 dated April 3, 1928, or of any other suitable construction, and its control electromagnet 15 acts upon a valve 16.

The magnet 15 is periodically energized by passage of current through it from a battery 17 or other suitable source of current under the action of circuit control mechanism.

Figure 2:
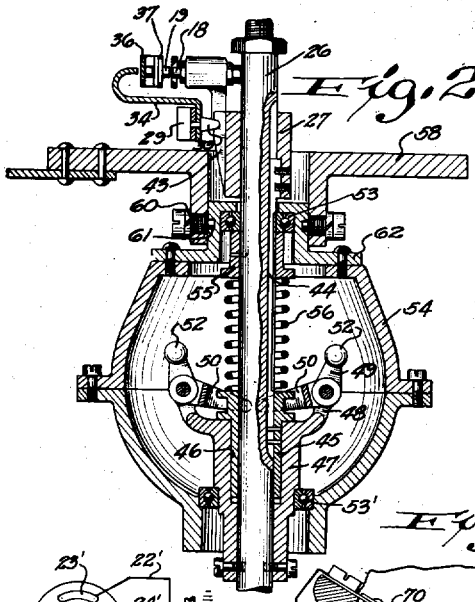
Fig. 2 is a detail sectional view taken on the line 2—2 of Fig. 1, parts being broken away.

As shown in Figs. 1 and 2, this control mechanism includes an insulated fixed contact 18 and a movable contact 19.

One side of the battery 17 is connected to an engine driven distributor brush 24 cooperating with an insulated distributor contact 23 connected in series with the coil of the electromagnet 15 which connects through conductor 21 with ground at 20 while the other side of the battery is connected by a conductor 25 with a fixed contact 18 while the contact 19 is shown as grounded at 26. Thus, when the contacts 18 and 19 are in closed position and the brush 24 is riding over the contact 23, the magnet 15 will be energized and the valve 16 will then be opened to allow fuel to pass to the engine cylinder.

In order that the period during which the contact 18 is in contact with the contact 19 may, through a wide speed range, be independent of the engine speed, and may, thereafter, be varied at the higher speeds, I have provided the mechanism shown in Figs. 1 and 2.

This mechanism includes a shaft 26 driven by the engine and having a timing cam 27 keyed thereto and provided with teeth or projections 28, there being as many of these as there are cylinders that may be conveniently supplied with fuel from one control mechanism. A hammer member includes a spring 29 anchored at its ends at 30 and curved therefrom as at 31 to a central portion 32 which carries a curved projection 33 and a laterally-extending member 34 having an upwardly-extending projection 35. With this construction, as the cam 27 turns in a counter clockwise direction as viewed in Fig. 1 its lobes 28 successively engage the projection 33 which causes said projection to be moved away from the shaft, thereby bowing the spring 29 outwardly, and directly after each lobe passes said projection the energy stored up in the spring causes it to move toward the shaft and to some extent beyond its normal position, with the result that the projection 35 delivers a blow to a part 36 of the movable contact.

The part 36 and the spring 37 carrying the contact point 19 are connected to a spring 38 secured to a post 39 and form a flexible support. The part 36, which may be of sheet metal or spring material, has a hook-shaped end 40 which acts as a stop to limit the amplitude of vibration of the spring 37. When the member 35 strikes the part 36 the other parts associated therewith are also moved toward the shaft, with the result that the contact points are engaged and the circuit through the magnet is established. Where the interval of circuit closure is too brief to suit the design or requirements of the engine this period may be prolonged by putting a small weight 41 on the outer end of the spring 37 so that the inertia of this weight, after the contacts have closed, will resist the tendency of their contacts to open, as said weight has a greater amplitude of movement and thereby tends to move toward the shaft after the contacts are engaged, and will reverse its movement later. Where such a weight is used a rubber buffer 42, associated with the member 36, may absorb any shock due to a possible rebound of this weighted spring arm.

Inasmuch as the hammer previously referred to always has substantially the same movement, no matter how fast the cam 27 is rotating, the movable contact 19 will remain in contact with the contact 18 for the same period at all engine speeds under the conditions above described. However, when a certain predetermined speed is reached it is desirable to decrease the fuel supply so that the speed of the engine does not exceed a predetermined maximum speed, and for this purpose I provide the timing cam with tapered tooth cam portions 43 which are brought into action by a governor that only functions at the higher speeds.

As shown, the cam 27 is slidably mounted on one end of the shaft 26 and secured to a key 44 mounted in a keyway in said shaft and connected at its other end to a sleeve 45 slidably mounted on said shaft and within a bore 46 in the hub 47 of a spider 48 fixed to the shaft 26. This spider has arms upon which the levers 49 of the governor are pivotally mounted, said levers having forked portions 50 provided with suitable pin projections engaging in an annular groove in the upper end of said sleeve 45 and having weights 52 on their free ends. The shaft 26 is suitably journalled at one point in a bearing 53 carried by a casing 54, and a bearing 53′ is provided at the lower end of the casing. A collar 55 is mounted on the shaft 26 and a spring 56 is interposed between said collar and said sleeve. The key 44 is free to move through the inner race of the bearing 53 and the collar 55. The contact supports and the supports for the spring 29 are mounted on a plate 58 which has a tubular hub portion that may be mounted for rotation relative to the casing 54, as by providing screws 60 in said hub portion engaging in annular grooves 61 in a part 62 of said casing.

Thus, when a predetermined high working speed has been reached the governor starts to function, and as the weighted ends of the levers 49 swing outwardly against the action of the spring 56 the sleeve 45, key 44 and cam 27 are raised upwardly, thus bringing the tapered portion 43 of the teeth into cooperative relation with the projection 33 and thus causing the hammer to deliver a lighter and lighter blow to the movable contact and producing a briefer and briefer circuit-closing interval for the magnet, thereby cutting down the fuel charge, until finally the speed reaches a maximum and the cam no longer strikes the hammer and the fuel supply is shut off and the engine is thus prevented from exceeding the maximum speed.

Figure 3:
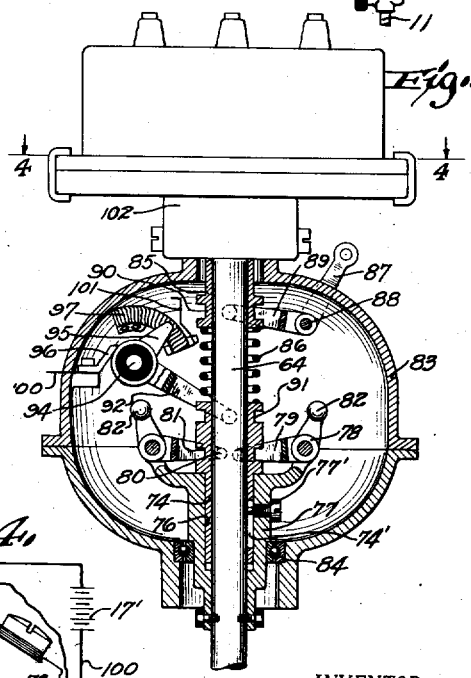
Fig. 3 is a view, partly in section, showing a modified form of part of the control mechanism.
Figure 4:
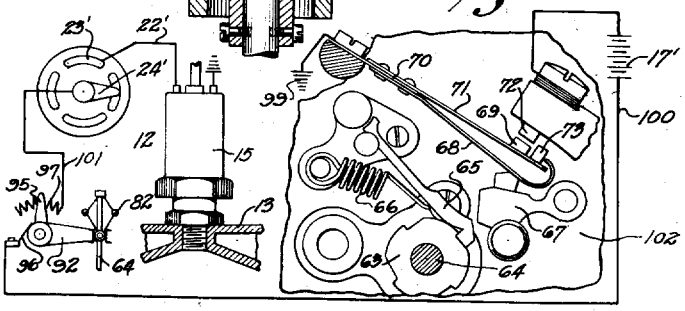
Fig. 4 is a detail sectional view taken on the line 4—4 of Fig. 3, together with other parts of the system shown diagrammatically.

When it is not feasible to control the current supply from a part capable of functioning under both conditions of operation, I have associated a governor-controlled variable resistance with a constant-period switch mechanism as shown in Figs. 3 and 4 to provide control mechanism for accomplishing the desired result.

For a further illustration I have shown a constant-period switch mechanism which for the most part is of well-known construction but which, when longer circuit-closing periods are desired, has been modified from its usual construction. Briefly, this mechanism includes a timing cam 63 mounted upon an engine-driven shaft 64 and engaged by a releasable latch 65 restrained by a spring 66, said latch being moved by said cam periodically to deliver a blow against a pivoted hammer 67 which in turn strikes a part 68 of the movable contact 69. The part 68 is secured to a spring 70, as is also the spring 71 carrying the contact, so that when said hammer strikes the part 68 the contact on the part 71 is moved into engagement with a suitably insulated fixed contact 72. For a more detailed explanation of this type of switch mechanism reference is made to United States Letters Patent No. 1,246,818, to A. A. Kent, it being understood that this switch structure is selected as an example of one form of switch mechanism that may be used in the combination which constitutes a part of my invention. As a modification of the above described structure, I have provided a weight 73 on the spring 71 beyond the contact in order to prolong the circuit-closing period, as explained above in connection with the part 37 and the weight 41.

Referring to Fig. 3, a sleeve 74 is slidably mounted on the shaft 64 and within a bore 76 in the hub of a spider 77 fixed to said shaft. This spider has arms upon which the levers 78 of the governor are pivotally mounted, said levers having forked portions 79 provided with suitable pin projections 80 engaging in the annular groove 81 of said sleeve and having weights 82 on their free ends. The shaft 64 is suitably journalled in the upper end of the casing 83 and a bearing 84 is provided at the lower end of the casing. A collar 85 is mounted on said shaft and a spring 86 is interposed between said collar and said sleeve. This collar may be manually adjustable to vary the tension of the spring 86 by means of a manually-controlled lever 87 pivoted at 88 and having a forked portion 89 associated with an annular groove 90 in said collar and an exteriorly disposed operating arm. The sleeve 74 has an annular groove 91 associated with the forked portion 92 of a lever whose shaft 94 is pivotally mounted on the casing. This lever has a switch arm 95 suitably insulated from the pivot shaft and receiving current from a brush 96. The arm 95 engages or rides over a resistance element 97 spirally wound upon a suitable insulating support. A stop pin 77′ is associated with a slot 74′ to limit the movement of the sleeve 74.

With this construction, after a predetermined high speed has been attained by the engine the governor starts to raise the sleeve 64 and this swings the lever 93 and hence the arm 95, causing it to include more and more resistance in the control circuit, and this has the effect of gradually decreasing the duration of movement of the fuel-metering device until finally when a predetermined maximum speed has been reached the included resistance is so great that the strength of current furnished to the electromagnet is insufficient to lift the control valve and hence the fuel supply is cut off and the engine slows down to a point below maximum speed.

A circuit arrangement is shown in Fig. 4, wherein the movable contact 69 is grounded at 99 and a conductor 100 connects the contact 72 with the brush 96, and a conductor 101 connects one end of the resistance element 97 with the distributor brush 24′ which is actuated by the engine to periodically engage the distributor contact 23′ connected by a conductor 22′ to one terminal of the operating electromagnet of the control valve 12, the other terminal of said operating magnet of the valve 12 being to ground as shown in Fig. 4. The battery 17′ is shown as connected in between portions of the conductor 100. Thus, during the period the contacts 69 and 70 are engaged the brush 24′ is engaged with one of the distributor contacts and current is supplied to the electromagnetic valve associated with that contact and is controlled as above described.

It is to be noted that the plate 58 carrying the contacts 18 and 19 may be rotated relative to the cam 27 to vary the time in the cycle at which the contacts are engaged and thus the time of injection may be advanced or retarded. Similarly the member 102, similar to the member 58 and upon which the contacts 69 and 72 are mounted, may be adjusted angularly relative to the cam 63 to advance or retard the time of injection. Furthermore, an automatic advance may be associated with the cam 63 in known manner.

While the invention has been described more particularly in connection with an electromagnetically-controlled fuel-metering valve, it will be understood that any other suitable metering device may be associated with the electromagnet, in combination with the control means above described, and be within the scope of the appended claims.

I desire it to be understood that this invention is not to be limited to any particular form or arrangement of parts except in so far as such limitations are specified in the claims or necessitated by the prior art.

What I claim as my invention is:

1. In a fuel injection system, the combination of a fuel-metering device, an electromagnet for controlling said device, and a control circuit for said electromagnet including means influencing the current supply to said magnet to actuate said device to supply substantially constant quantity fuel charges through a predetermined range of engine speeds and thereafter decreasing the amount of fuel above a predetermined engine speed and cutting off said fuel supply at a predetermined maximum speed.

2. In a fuel injection system, the combination of a fuel-metering device, an electromagnet for controlling said device, and a control circuit for said electromagnet including means for periodically energizing said magnet for substantially constant periods through a predetermined range of engine speeds to cause said device to supply substantially constant quantity fuel charges at these speeds, and governor-controlled mechanism operable above said speed range influencing the current supply to said magnet to decrease the amount of fuel charge and to cut off said fuel supply at a predetermined maximum speed.

3. In a fuel injection system, the combination of a fuel-metering device, an electromagnet for controlling said device, a control circuit for said electromagnet including switch mechanism for periodically energizing said magnet for substantially constant periods at different engine speeds, a governor, and means, controlled by said governor, for modifying the action of said switch mechanism above a predetermined speed to decrease the fuel supply to the engine and to cut off said fuel supply at a predetermined maximum speed.

4. In a fuel injection system, the combination of a fuel-metering device, an electromagnet for controlling said device, a control circuit for said electromagnet including switch mechanism for periodically energizing said magnet for substantially constant periods at different engine speeds, an engine-driven cam for actuating said switch mechanism, a governor, and means, controlled by the governor, to shift said cam to modify the action of said switch mechanism above a predetermined speed to thereby decrease the fuel supply to the engine and to cut off said fuel supply at a predetermined maximum speed.

5. In a fuel injection system, the combination of a fuel-metering device, an electromagnet for controlling said device, a control circuit for said electromagnet including switch mechanism for periodically energizing said magnet for substantially constant periods through a predetermined range of engine speeds, and a governor-controlled variable resistance operable above a predetermined speed to decrease the fuel supply to the engine and to cut off said fuel supply at a predetermined maximum speed.

6. In a fuel injection system, the combination of a fuel-metering device, an electromagnet for controlling said device, a control circuit for said electromagnet including switch mechanism comprising a fixed and a movable contact, a hammer member for actuating said movable contact, a shiftable engine-driven timing cam for actuating said hammer member, and a governor, operable above a predetermined engine speed, to shift said cam to vary its action on said hammer member to decrease the fuel supply and to render said hammer member inoperative above a predetermined maximum speed.

7. In a fuel injection system, the combination of a fuel-metering device, an electromagnet for controlling said device, a control circuit for said electromagnet including switch mechanism comprising a fixed and a movable contact, a hammer member including a bowed spring and a part secured thereto and adapted to engage and actuate said movable contact, a shiftable engine-driven cam for actuating said hammer member to provide constant circuit-closing periods through a wide range of engine speeds, and a governor, operable above a predetermined engine speed, to shift said cam to vary its action on said hammer member to decrease the fuel supply and to render said hammer member inoperative above a predetermined maximum speed.

8. In a fuel injection system, the combination of a fuel-metering device, an electromagnet for controlling said device, a control circuit for said electromagnet including switch mechanism comprising a fixed and a movable contact, actuating means for said movable contact and a weight associated with said movable contact to prolong its circuit-closing period over that imposed upon it by said actuating means.

9. In a fuel injection system, the combination of a fuel-metering device, an electromagnet for controlling said device, and a control circuit for said electromagnet including means for periodically influencing the current supply to said magnet for substantially constant periods to actuate said device to supply substantially constant quantity fuel charges through a predetermined range of engine speeds regardless of such speeds.

10. In a fuel injection system, the combination of a fuel-metering device, an electromagnet for controlling said device, and a control circuit for said electromagnet including means for periodically energizing said electromagnet for substantially constant periods through a predetermined range of engine speeds to cause said device to supply substantially constant quantity fuel charges at these speeds.

11. In a fuel injection system, the combination of a fuel-metering device, an electromagnet for controlling said device, and a control circuit for said electromagnet including means for periodically energizing said magnet for substantially constant periods through a predetermined range of engine speeds to cause said device to supply substantially constant quantity fuel charges at these speeds, a governor controlled mechanism operable above a predetermined speed range influencing the current supply to said magnet to decrease the amount of fuel charge above a predetermined speed range.

In testimony whereof, I affix my signature.

LOUIS O. FRENCH.